(12) United States Patent
Crosby et al.

(10) Patent No.: US 9,110,780 B2
(45) Date of Patent: Aug. 18, 2015

(54) MEMORY UTILIZATION ANALYSIS

(71) Applicant: Riverbed Technology, Inc., San Francisco, CA (US)

(72) Inventors: Peter Anthony Crosby, Edmond, OK (US); Robert Meagher, Greenfield, NH (US); Patrick J. Malloy, Washington, DC (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 388 days.

(21) Appl. No.: 13/746,273

(22) Filed: Jan. 21, 2013

(65) Prior Publication Data

US 2014/0129793 A1    May 8, 2014

Related U.S. Application Data

(63) Continuation of application No. 12/705,570, filed on Feb. 13, 2010, now Pat. No. 8,359,450.

(60) Provisional application No. 61/152,462, filed on Feb. 13, 2009.

(51) Int. Cl.
*G06F 12/02* (2006.01)
*G06F 9/50* (2006.01)
*G06F 11/34* (2006.01)
*G06F 11/36* (2006.01)

(52) U.S. Cl.
CPC .......... *G06F 12/023* (2013.01); *G06F 9/5016* (2013.01); *G06F 11/3476* (2013.01); *G06F 11/366* (2013.01); *G06F 11/3636* (2013.01); *G06F 11/3664* (2013.01)

(58) Field of Classification Search
CPC ...................................................... G06F 12/023
See application file for complete search history.

(56) References Cited

U.S. PATENT DOCUMENTS 5,408,650 A    4/1995  Arsenault
6,748,522 B1   6/2004  Gregoire et al.
(Continued)

OTHER PUBLICATIONS

Steven Haines, "Memory Analysis Best Practices within Eclipse", Quest Software, www.Quest.com, Jun. 2008.
(Continued)

*Primary Examiner* — Yong Choe
(74) *Attorney, Agent, or Firm* — Park, Vaughan, Fleming & Dowler LLP

(57) ABSTRACT

The performance of a monitored system is profiled based on sampling a portion of its operations. In one embodiment, the monitored system allocates memory for objects created as instances of classes and automatically performs regular garbage collection to reclaim memory. A variety of sampling techniques are used to minimize the impact on the performance of the monitored system. Characteristic memory utilization patterns can then be estimated for classes based on the samples. The patterns may be presented to a user for review and analysis. Characteristics of the monitored system's performance may be presented in an interactive interface that allows the user to trace the cause of the presented memory utilization patterns, and provides statistics regarding memory allocation and release to guide the user in this analysis.

23 Claims, 7 Drawing Sheets

(56) References Cited

U.S. PATENT DOCUMENTS

| | | |
|---|---|---|
| 7,730,460 B1 | 6/2010 | Warren et al. |
| 2005/0076184 A1 | 4/2005 | Schumacher |
| 2006/0095427 A1 | 5/2006 | Dickenson |
| 2006/0155949 A1 | 7/2006 | Purushothaman |
| 2006/0184776 A1 | 8/2006 | Bishop et al. |
| 2008/0046673 A1 | 2/2008 | Hwang |
| 2008/0270994 A1 | 10/2008 | Li et al. |
| 2010/0017791 A1 | 1/2010 | Finkler |

OTHER PUBLICATIONS

Steven Haines, "Advanced Memory Analysis", www.Quest.com, Apr. 2009.

Steven Haines, "Memory Analysis within Eclipse in Practice with JProbe", Quest Software, www.Quest.com, Jun. 2008.

MEMORY UTILIZATION ANALYSIS

CROSS-REFERENCE TO RELATED APPLICATIONS

This application is a continuation of U.S. patent application Ser. No. 12/705,570, filed Feb. 13, 2010, entitled "MEMORY UTILIZATION ANALYSIS," which claims the benefit of U.S. Provisional Patent Application No. 61/152,462, filed Feb. 13, 2009, both of which are incorporated by reference in their entirety.

BACKGROUND

This invention relates to the field of application development and analysis, and in particular to a method and system that analyzes an application's use of memory, to identify memory leaks and their causes.

The increasing level of complexity and sophistication of application programs has resulted in a significant increase in the amount of memory being used in such applications. Even though the cost of memory has significantly decreased over time, allowing for systems with substantial amounts of memory, the amount of memory available still remains a finite quantity.

If an application consumes an inordinate amount of memory, it will generally result in poor performance, and may result in failure of the application, and in some cases, a system failure. If the application is used for commercial transactions, such as operating a vendor's website, such poor performance and/or unreliable performance can result in the loss of sales, and in many cases, the loss of repeat customers. If the application is used for managing a business, such as an accounting or inventory application, poor or unreliable performance will result in a loss of productivity, and other problems.

A primary cause of excessive memory utilization is the presence of "memory leaks" within an application. As an application is run, it will typically request allocations of memory as required for each task, then release the memory for subsequent allocation to other tasks as each task is completed. The release of memory may be direct or indirect. In systems that use direct release, the designer explicitly de-allocates the memory when it is no longer required. If the user does not explicitly de-allocate memory that is no longer required, that memory is not made available for subsequent allocations.

In systems that use indirect release, the user releases memory by decoupling the links/references to the items that are no longer being used, and the system periodically performs 'garbage collection' to perform the de-allocation that identifies the memory as being available for subsequent reallocation. For example, terminating a subroutine that had allocated memory for 'local' variables that are only used within the subroutine will decouple the links to this memory, because these local variables are no longer within the current scope of the program. The next time the garbage collector is run, it will determine all of the 'reachable' objects (objects within the current scope of the program), and will de-allocate/release/free any memory that is not allocated to a reachable object. Although garbage collectors alleviate the task of explicitly releasing memory when it is no longer required, they are not fool-proof, particularly if the creator of the application is careless with regard to controlling the scope of variables.

If the release of memory is not properly performed, the amount of memory available for subsequent allocation will decrease; this loss of allocatable/available/free memory is termed a memory leak. If a memory leak continues over time, the amount of allocatable memory will decrease to a point that a substantial amount of time will be consumed by the system as it tries to satisfy each subsequent allocation request with less and less available memory; eventually, the amount of allocatable memory will decrease to a point at which the application cannot continue, for lack of available memory, even though the memory that was not properly released is not being used.

In prior decades, most systems and applications were used sporadically, being turned on and off as required; as such, applications with memory leaks would often be terminated before they introduced a noticeable degradation in system performance. In today's "24-7" environment, however, in which applications are rarely turned off, even a "slow leak" in memory will eventually degrade system performance.

If applications are not sufficiently protected from each other with regard to memory allocation, a memory leak in one application will have the effect of slowing down and eventually crashing other applications as well. This 'side-effect' of an application's memory leak often makes it difficult to determine which application is responsible for the degradation in system performance, particularly in environments that do not allow for applications to be purposely shut down to perform proper fault isolation tasks.

Conventional memory utilization analyzers take 'snapshots' of an application's use of memory over time, then compare snapshots to identify growth patterns. For example, in "Memory Analysis Best Practices Within Eclipse", a white paper by Steven Haines, published by QUEST SOFTWARE™, June 2008, the author instructs: "[t]ake a snapshot of the heap before your code runs[; t]ake a snapshot of the heap after your code runs[; and . . . t]he best strategy is to compute the difference between the "before" heap and the "after" heap, and then verify that new objects are expected to be in the heap. If they're not, then you have identified a memory leak and can resolve it!" ("Memory Analysis Best Practices Within Eclipse", page 7, lines 3-15; the heap is a list of all objects to which memory is currently allocated.) A variety of analysis tools are available for presenting a visualization of the contents of the heap, including a 'dominator tree' representation that illustrates the hierarchical dependencies among the objects in the heap, detailed further below.

The author of the aforementioned white paper identifies the shortcomings of the conventional 'snapshot' approach to memory utilization analysis: "However, keep in mind that only you, as the developer of the code, can properly understand these 'lingering objects' in the context of your application and determine whether there is truly a memory leak" ("Memory Analysis Best Practices Within Eclipse", page 7, lines 27-29). That is, merely comparing a list of before-and-after active objects does not, per se, identify a memory leak. Additionally, if the code segment being analyzed is lengthy, with numerous functions and subroutines, it is generally very difficult to identify where the memory leaks are being created, without searching through the code for each instance that each suspect object is likely to have been instantiated in memory.

It would be advantageous to be able to monitor the memory utilization of an application over time, to clearly identify memory leaks or other anomalies. It would also be advantageous to be able to perform this monitoring of memory utilization in a production environment without significantly interfering with the operation of the application. It would also be advantageous to be able to identify the cause of memory leaks or other anomalies within the application.

These advantages, and others, can be realized by augmenting an application to record memory allocations and releases as they occur over time, and providing an analysis system that presents characteristic memory utilization patterns to a user for review and analysis. A variety of sampling techniques are used to minimize the impact of this memory utilization monitoring on the performance of the application, and the analysis system is configured to estimate the overall memory utilization based on these samples. Because these samples of the memory allocations are taken continuously as the application is running, the analysis system can provide visualizations of the memory utilization patterns that allow a user to easily recognize anomalous behavior. The analysis system includes an interactive interface that allows the user to trace the cause of the presented memory utilization patterns, and provides statistics regarding memory allocation and release to guide the user in this analysis. In a preferred embodiment, the monitoring of memory utilization also includes conventional heap dumps, and the interactive interface is configured to couple the memory utilization patterns with the conventional presentation of such heap dumps, to facilitate efficient resolution of memory leaks and other anomalies.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1A:
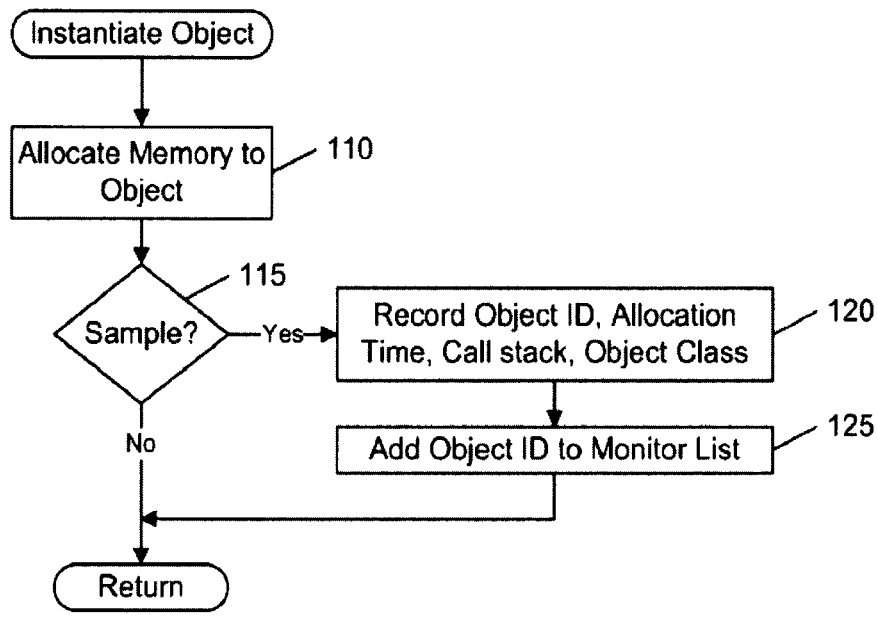
FIGS. 1A-1C illustrate example flow diagrams for augmenting an application in accordance with aspects of this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention is presented using the paradigm of a system that automatically performs regular garbage collections. These garbage collections may be performed periodically, or on an as-needed basis, when the amount of available memory drops below some particular criterion, or as a combination of both. One of skill in the art will recognize that the principles presented herein are also applicable to systems in which the application is programmed to perform such garbage collections, or to explicitly release memory allocations, or a combination of both.

Providing an efficient and effective memory utilization analysis method or system involves satisfying a variety of objectives and constraints. Ideally, if each memory allocation and release were recorded, with an indication of the segment of code that was responsible for each allocation, an analysis system could process this information to identify objects that are repeatedly created and not released, as well as identifying which segment of the code needs to be modified to correct each such memory leak. However, the amount of storage and processing time required to record such information for each and every memory allocation and release renders this approach impractical for any but the simplest of applications.

Additionally, even if such information could be recorded, the number of objects that are allocated memory in a non-trivial application can easily amount to thousands, or hundreds of thousands, of objects each minute. If the application's memory leaks are limited to a few objects that are often allocated, these object will stand out from the other objects and be identifiable to the user. If, on the other hand, the application's memory leaks are more pervasive, as is typical, distinguishing particular objects that are not being effectively released becomes increasingly difficult. Because the life-span of each object in an application can vary from a mere instance to the entire duration of the application, it is difficult to determine whether memory for any particular object remains allocated longer than it should. Therefore, automated means of identifying objects that are the result of portions of code causing a memory leak is difficult, if not impossible. That is, even with total information available regarding allocations and releases, an object-based analysis suffers the same limitations as the aforementioned before-and-after heap analyses of requiring someone intimately familiar with the application to identify objects that should have been released sooner.

The inventors have recognized that recording the allocation and release of memory for individual objects, and the cause of such allocations, provides the best information for tracing the cause of memory leaks, but the practical limitations of collecting such information, automating the analysis, and presenting meaningful information to the user require the use of alternative techniques, based on characteristic memory utilization patterns, and in particular memory utilization patterns associated with memory leaks.

In particular, the inventors have recognized that a problematic memory leak will generally exhibit a somewhat regular behavior as the application is run. That is, if a memory leak occurs, but does not re-occur, its effects will not be cumulative, and will not result in a continuing degradation in the performance of the application; accordingly, such a memory leak would not generally be considered problematic.

The inventors have also recognized that problematic memory leaks are generally characteristic of the techniques used to develop the application. That is, if a problematic memory leak exists, it is not likely to be isolated to a single object; rather, the problem is likely to be repeated each time memory is allocated to a similar object. Accordingly, a sampling of allocations and releases will be sufficient to identify memory utilization patterns, without requiring the recording of each and every allocation and release.

Therefore, in a preferred embodiment of this invention, select allocations are recorded, including an identification of the object being instantiated, as well as the section of code in the application that initiated this instantiation. Additionally, the release of each of these sampled allocations are recorded. In this manner, if memory leaks or other memory utilization anomalies are present in the application, they are likely to be detected, based on when or if the sampled allocation is released. Further, because the sampling includes recording an identification of the code segment that caused the allocation, it is likely that this identification will be representative of the code segments that are responsible for the causes of allocations throughout the sampling period. That is, by recording samples of allocations and releases, the overhead associated with recording this information is substantially reduced, yet the information that can be gleaned from this sampled information will generally be sufficient to identify memory leaks, and their causes.

Additionally, the life spans of similar objects can be expected to be similar; or, alternatively stated, the expected life span of an object can be expected to be dependent upon its type, or class. For example, in a payroll application, the life span of an employee's record within the application is likely to be similar to the life span of any other employee's record. Alternatively stated, properly allocated and released objects of a given type/class can be expected to be significantly different from the life span of the same objects that are not properly released. Accordingly, an analysis and presentation of memory utilization patterns based on the type or class of objects can be expected to provide a more meaningful result to a user than results based on particular objects.

In a preferred embodiment of this invention, even though the allocations are recorded on an object-by-object basis, the analysis and presentation of memory utilization patterns are based on the type or class of objects being allocated and released. However, because the details of the sampled allocations and releases are available, the user is provided the opportunity to investigate the specific causes of any memory utilization pattern that appears to indicate a memory link or other memory utilization anomalies.

Recording Allocations and Releases

Figure 1B:
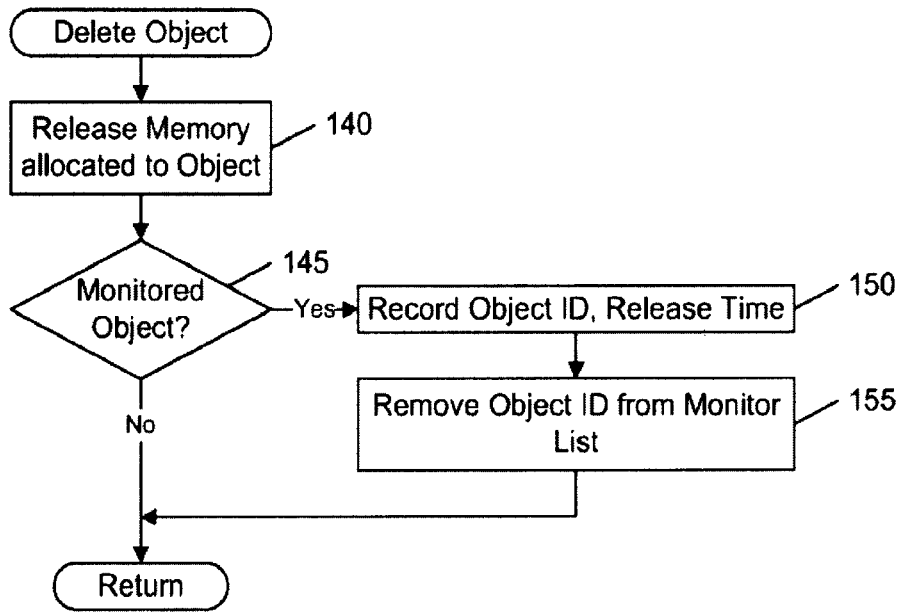
Figure 1C:
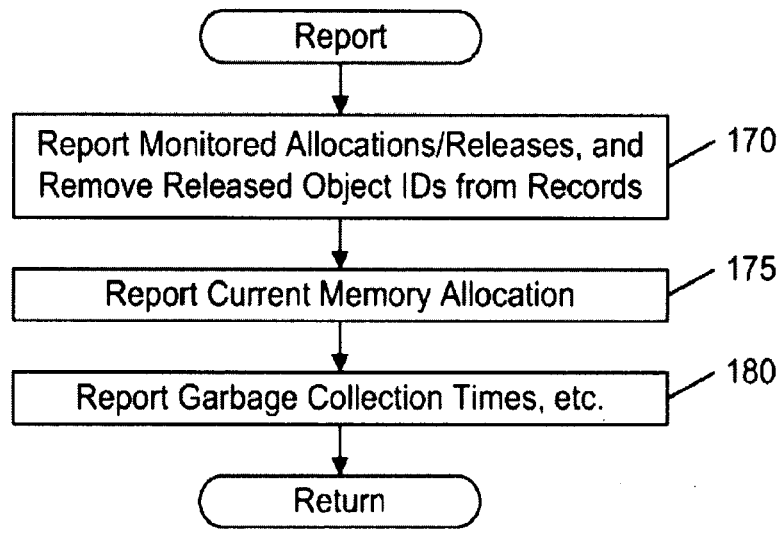

FIGS. 1A-1C illustrate example flow diagrams for augmenting an application in accordance with aspects of this invention. In a dynamic memory allocation process, objects are created (instantiated in memory) as needed, when they first become within the scope of the application (become 'reachable'), then disposed (memory released) when no longer within the scope of the application ('unreachable'). In accordance with an aspect of this invention, some of these instantiations and subsequent releases are recorded for subsequent analysis.

FIG. 1A illustrates the augmentation of a conventional memory allocation process that is typically called as each object is instantiated in an application. At 110, the required amount of memory is allocated to the object, in the conventional manner.

At 115, the augmented process determines whether this allocation should be sampled for recording. Any of a number of techniques can be used for this sampling, as detailed further below. In a straightforward embodiment of this invention, every Nth allocation is sampled, where N can be any number, depending on the degree of precision desired, balanced against the overhead introduced by this sampling. In a typical embodiment, N is at least one hundred, so that the performance of the application is not significantly affected by this sampling overhead, and preferably less than a thousand, to assure that even slight memory leaks are represented in the sampled recordings.

If the allocation is selected for recording, an identification of the object is recorded as well as the time of the allocation and an identification of the location in the application from which the instantiation was initiated, at 120. This location information is typically obtained from the last entry in the 'call stack' of the application; in a preferred embodiment, the entire call stack is recorded, to identify the path that lead to this allocation. As detailed further below, the class of the object is also preferably recorded, to facilitate the presentation of memory utilization trends and statistics based on object class. Other information may also be recorded, such as the size of the object, although this information can be determined from the object class.

At 125, the object ID is also recorded in a list of objects currently being monitored, to facilitate a rapid identification of monitored objects in the augmented release process of FIG. 1B.

FIG. 1B illustrates the augmentation of a conventional deletion of an object from active memory, such as typically performed in a garbage collection process. In a typical garbage collection process, each reachable object in the currently allocated dynamic memory (conventionally termed the 'heap') is identified, so that the memory currently allocated to unreachable objects can be released for allocation to subsequently instantiated objects. To allow for efficient subsequent allocation, the reachable objects in the heap are typically relocated to form a contiguous block of memory. At 140, the memory currently allocated to each unreachable object is released in the conventional manner.

At 145, the augmented process determines whether the unreachable object is included in the aforementioned list of monitored objects. If it is a currently monitored object, its identifier and the time of release is recorded, at 150, and its identifier is removed from the list of currently monitored objects, at 155.

One of skill in the art will recognize that the particular form of the recorded information is irrelevant to the principles of this invention, and the reference herein to separate recordings and lists is presented for ease of understanding. It will be recognized that, for example, the release time can merely be another field in the record of allocations, rather than maintaining a separate list of releases. In like manner, the identification of currently monitored objects could be performed by identifying each object in this combined allocation/release record that has not yet been released. One of skill in the art will recognize, however, that maintaining separate lists for the particular functions may allow for more efficient processing.

With the augmented processes of FIGS. 1A and 1B, a sampling of allocations and corresponding releases will be recorded as the application is run; and, because the sampling rate can be kept low, the impact of this sampling will have a minimal affect on the performance of the application in an operating environment.

FIG. 1C illustrates an example flow diagram for reporting the records of the sampled allocations and releases, as well as other information that will facilitate the identification of memory utilization trends. This reporting is typically performed by writing the information to a file that can subsequently be accessed by an analysis program. The application is augmented to execute this process regularly, such as based on a time since the last execution, based on the number of currently recorded allocations, based on the occurrence of particular events in the application, based on a user request, or combinations of these and other reporting parameters.

At 170, the recorded allocations and releases are reported, and completed records of objects (allocated and released memory) are removed from the records within the application. At 175, the current status of the heap is reported, using conventional techniques for obtaining a snapshot of the memory allocation, as discussed above. Other application status information may also be reported, at 180, such as a record of the times and duration of garbage collection, and so on.

Analysis and Display of Monitored Information

Figure 2:
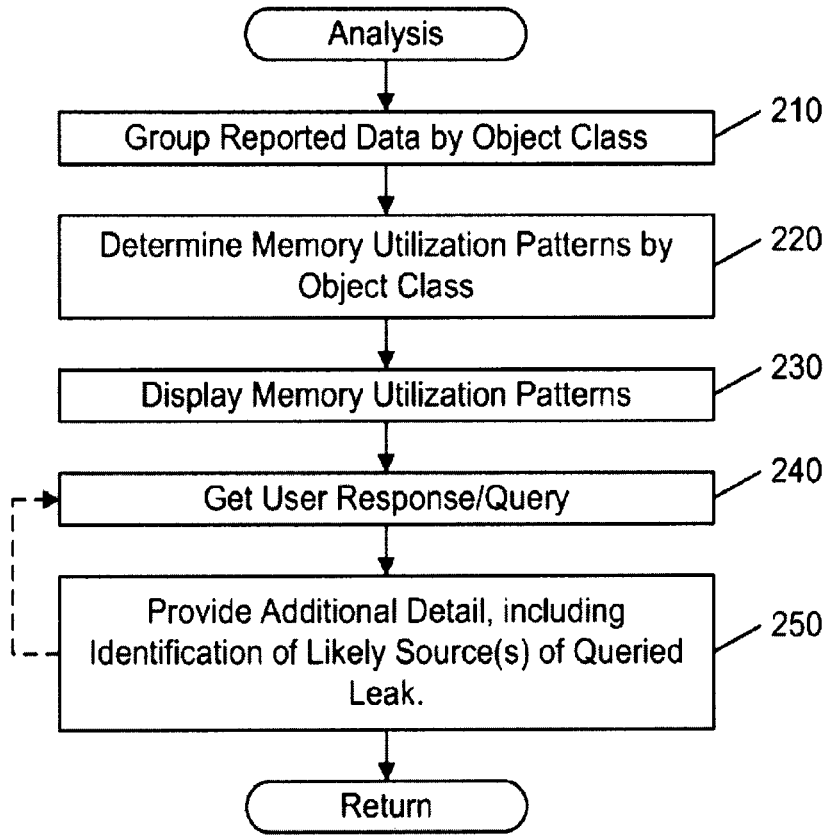
FIG. 2 illustrates an example flow diagram for analyzing and presenting memory utilization trends in accordance with aspects of this invention.

FIG. 2 illustrates an example flow diagram for analyzing and presenting memory utilization trends in accordance with aspects of this invention. FIGS. 3A-3D illustrate example displays of these trends and other statistics provided by this example analysis and presentation process.

As noted above, in a preferred embodiment of this invention, the analysis and presentation of information regarding memory utilization patterns is organized by object class. Presentation by object class will allow a user to quickly distinguish expected memory utilization and anomalous utilization, such as a memory leak. For example, in a typical payroll application, objects of class 'employee record' will be expected to have limited individual duration between allocation and release, as each employee is processed, and the number of employee records that are currently active/reachable during the application can be expected to remain fairly constant. Conversely, if the application is configured to create objects of class 'paycheck record' and then submit these objects regularly to a printing process, the life span of each paycheck record will be dependent upon when the paycheck record was created. That is, the creation of a continuously increasing number of paycheck records is proper behavior, and the number of active/reachable paycheck records can be expected to continually increase until they are offloaded to the printing process.

At 210, the information reported from the augmented application is organized by object class. Optionally, this grouping by class could have been performed by the application before the information was reported. However, performing this task in the analysis program reduces the imposed overhead at the augmented application.

At 220, memory utilization patterns are determined for each object class, or for each of the predominate object classes, or for each object class of interest to the user, or combinations of these and other selection parameters.

Of particular note, because the actual allocations and releases are recorded based on a sampling of the allocations, the characteristics of the memory utilization for any particular object class can be estimated/determined from these sampled allocations. In the example of sampling every Nth allocation, if the number of sampled objects of a particular class within a given period of time is k, the number of allocations for this class can be expected to have been N*k during this period. The accuracy of this estimate will be a function of the distribution characteristics of the class over time, and more sophisticated statistical techniques, common in the art, may be applied to refine this estimate. However, for the purposes of determining general memory utilization trends, the degree of accuracy required is fairly low.

Figure 3A:
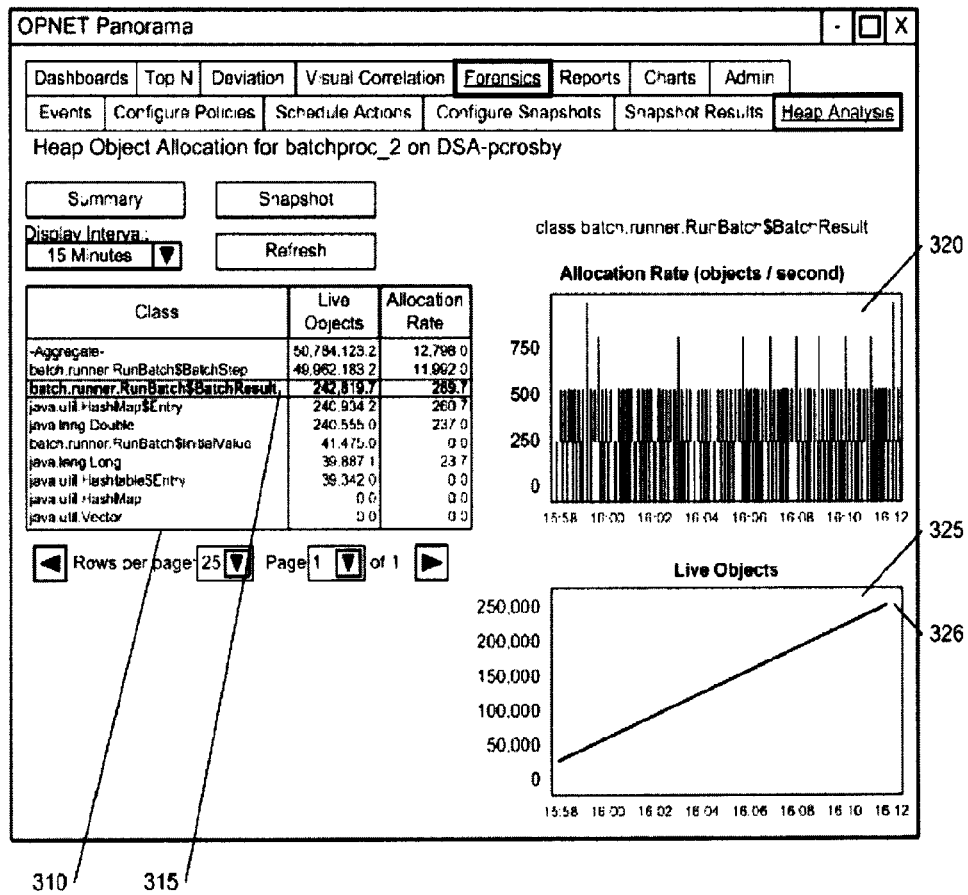
FIGS. 3A-3C illustrate example displays of memory utilization trends in accordance with aspects of this invention.

FIG. 3A illustrates an example presentation of allocation rates for a set of object classes, based on the recording of sampled allocations and releases. At the table 310, the number of live objects 311 of each class at the end of the given time period is presented, as well as the allocation rate during this time period. This allocation rate can be either an average over the time period, or an estimate of the rate at the end of the time period based on the characteristics/trend of the sampled allocations over this time period.

If the user selects an object class 315 at the table 310, the details regarding the allocations and releases for this object class are presented in graphic form 320, 325. In this example, at 320, the rate of allocation of the selected object class 315 is displayed over time (approximately fifteen minutes), and, at 325, the number of live/reachable objects in this class 315 is displayed for this same time period. In this particular example, the sampling occurred at approximately every 250 allocations, and each sampled allocation that was an object of this class 315 is estimated to have corresponded to about 250 allocations of that class 315. During the example fifteen minutes, nearly a thousand of the sampled allocations were of this class 315, with no releases, resulting in an estimated number of live/reachable objects of this class 315 at the end of the period of almost 250,000, at 326.

Of particular note, these graphs 320, 325 are based on the sampled allocations and releases, and not on the conventional snapshots of the heap. In the fifteen minutes represented by these graphs, over 40,000 allocations were recorded, or approximately fifty every second, allowing these graphs to provide sub-second resolution. Because the overhead associated with each recording is relatively slight, and the recording rate is relatively low, the overhead introduced to the application is also slight. Contrarily, if fifty conventional snapshots of the heap were attempted every second, the application's performance would be dramatically affected, and the reported allocation rates and resultant number of live objects would likely be meaningless with regard to the application's true allocation rates when not burdened with numerous snapshots every second. In this example, at the end of the fifteen minute interval, the heap contained over fifty million objects; reporting the contents of the heap, as is done in a conventional snapshot, would require reporting all of these fifty million objects. In a conventional memory utilization analysis, snapshots are typically taken only at particular points in time identified by the developer of the application to isolate identified problems, or, as noted in the aforementioned "Memory Analysis Best Practices Within Eclipse", at the beginning and end of selected processes within the application.

Figure 3B:
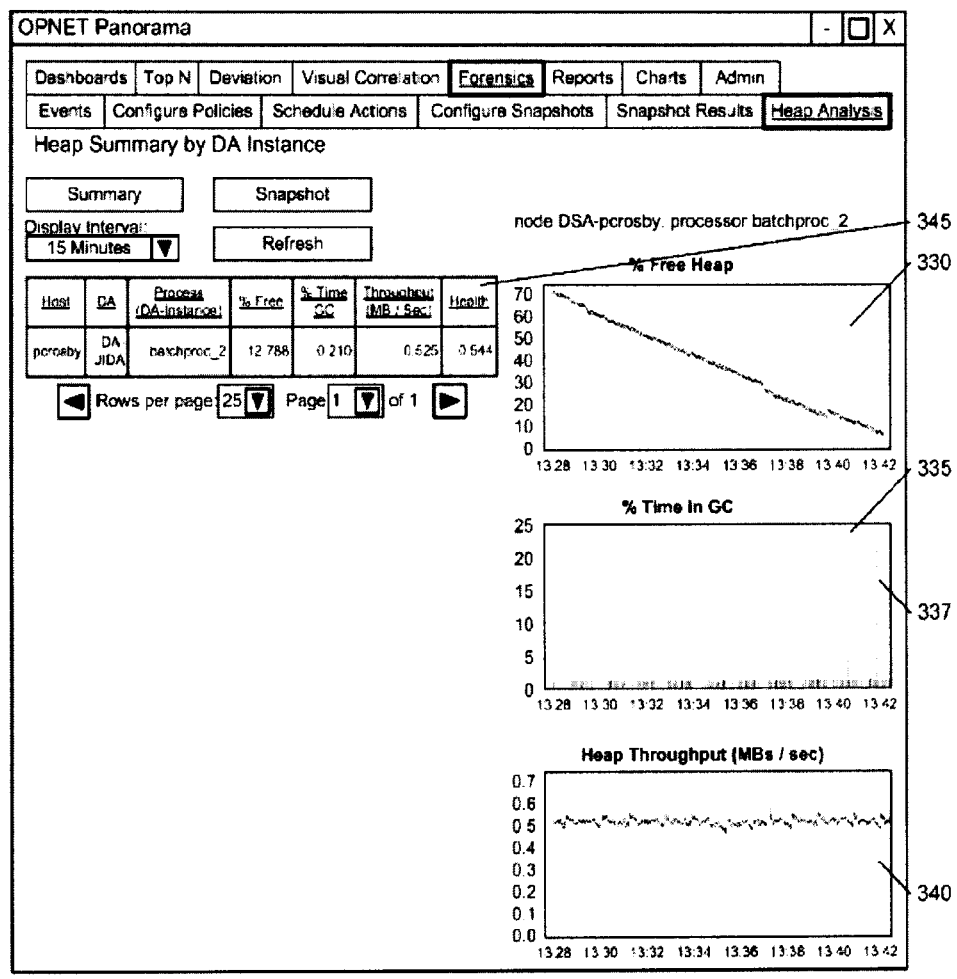

FIG. 3B illustrates another example presentation of memory utilization trends over time. In this example, the amount of available memory (free heap) is displayed over time based on the sampled allocations and releases, at 330. As can be seen, in this example application, the amount of available memory is continually decreasing, which is indicative of a severe memory leak. Additionally, at 335, the amount of time spent in garbage collection is illustrated, and as can be seen, this amount increases dramatically, at 337, as the amount of available memory becomes very low.

At 340, the allocation rate in megabytes per second is illustrated, based on the sampled allocations of objects and their size. As can be seen, the allocation rate is not decreasing, indicating that unless something changes, the application is likely to run out of available memory in the next few minutes. In a preferred embodiment, a 'health' index is given, at 345, which is intended to indicate the likelihood of the application being able to continue. This index ranges from 0 to 100, and in this example, the likelihood of the application being able to continue is estimated at less than one percent.

Figure 3C:
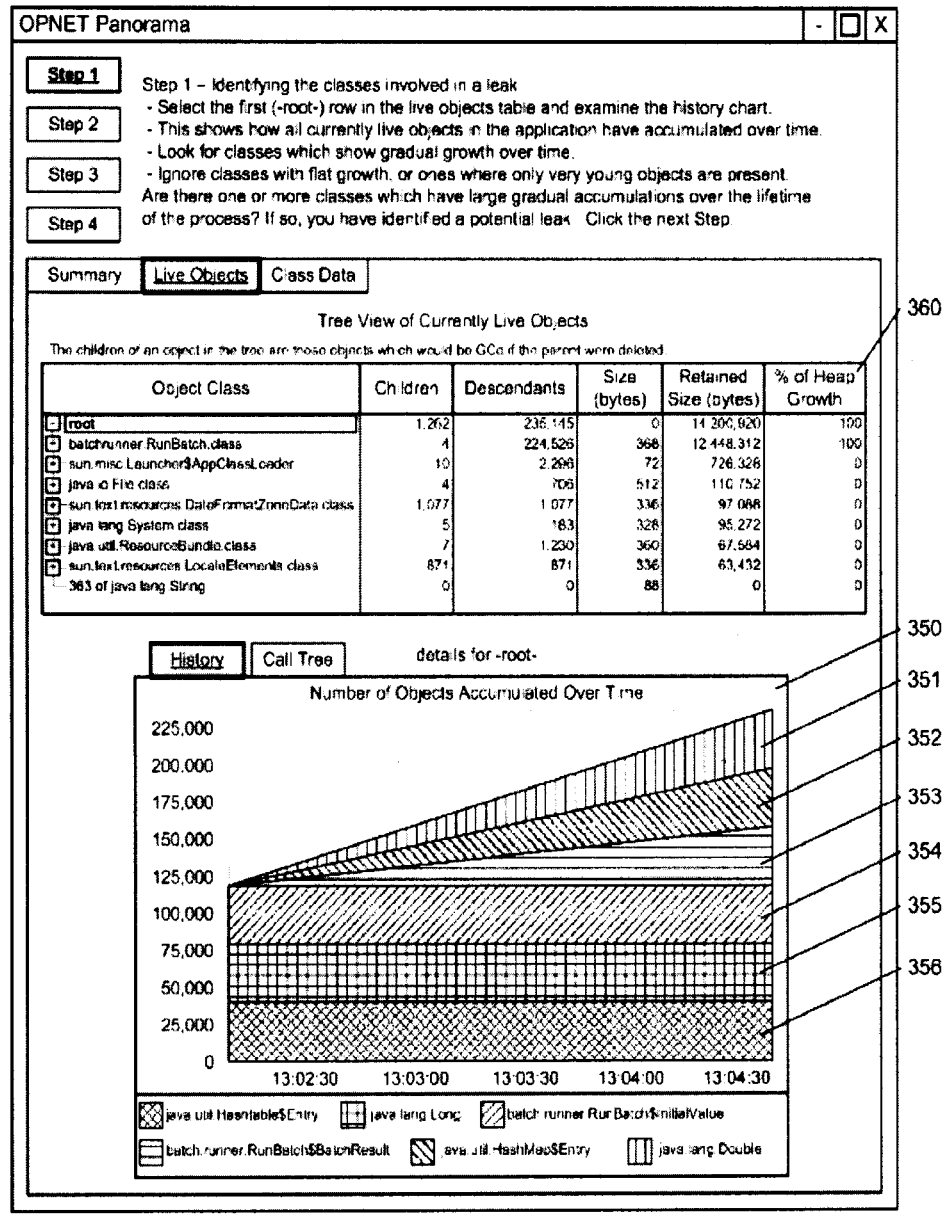

FIG. 3C illustrates another example presentation of memory utilization trends over time. In this example, the number of live/reachable objects in each object class is displayed over time, at 350. In this example, three of the object classes 354, 355, 356 exhibit a relatively consistent number of live objects at any given point in time, whereas the other three object classes 351, 352, 353 exhibit a continually increasing number of live objects over time, which is characteristic of a memory leak.

Alternatively, one or more of these object classes 351, 352, 353 could be records that are purposely created by the program, such as the aforementioned paycheck objects that are accumulated until they are sent to a printing process. By organizing and presenting the memory utilization trends based on object class, the user can easily distinguish between objects that are expected to consume more and more memory, and objects that are inadvertently consuming more and more memory (i.e. memory leaks).

Returning to FIG. 2, at 240, during the presentation of the memory utilization trends, in addition to providing the user control of the particular form of presentation, the user is provided the option of querying the system for additional details. Typically, this is provided by allowing the user to "drill down" for additional information by selecting a displayed object of interest, such as by 'clicking' on one of the patterns 351-356, or the corresponding text item in the table 360. Other forms of indicating a query for additional information are common in the art.

At 250, the more detailed information requested by the user is presented, including, as detailed further below, an identification of the likely cause/source of memory leaks.

It is significant to note that there is often a hierarchical relationship among objects and object classes. For example, a higher level object class (parent) may be defined as containing lower level object classes (descendents), and these lower level object classes may be defined as containing yet lower level object classes, and so on. This hierarchical relationship has a significant impact on the allocation and release of memory. When a parent object is instantiated, all of its descendent objects (children, grandchildren, etc.) are instantiated. Correspondingly, when a parent object is released, all of its descendent objects are released. In like manner, if a child object is released, its grandchildren, great-grandchildren, etc. objects are released.

As noted above, a variety of tools exist for presenting the hierarchical relationship among objects in a graphic tree form, commonly termed a dominator tree, based on the information provided in a conventional heap dump. A dominator tree, however, is very detailed, in that it includes each and every descendent object, and is not necessarily suitable for representing memory utilization in a form that conveys trend information to a user. Consistent with the aforementioned use of object classes to organize information in a form that is visually meaningful to a user, in a preferred embodiment of this invention, a novel form of the conventional dominator tree is used.

In accordance with this aspect of the invention, the reported heap dump for the selected time period is processed to create a dominator tree, but instead of including each descendent object at each level of the hierarchy, objects of the same object class are grouped together to form a single node on the tree. This grouping may be, and preferably is performed both laterally (siblings of the same class) and vertically (descendents of the same class). Each object class node also includes a count of the number of objects of the class being represented by that node. In this manner, it becomes readily apparent how many objects will be released if that particular object class node is released. Optionally, the number of bytes of allocated memory that each object class node represents may also or alternatively be used to convey the effect of the node's release.

The summarizing, or collapsing, of objects into an object class node provides for an effective visualization of the tree, and is particularly useful in the detection of memory leaks, which often consist of large collections of objects of a small set of classes. Preferably, the recorded allocation and release data associated with the descendent object classes are accumulated at each level within the tree, thereby enabling the calculation of the total percentage of the memory utilization associated with the descendants of each node in the tree. In a preferred embodiment, the accumulated data is sorted so that child nodes that contribute the most to the growth in memory allocation appear as the first descendants at each level.

Figure 4A:
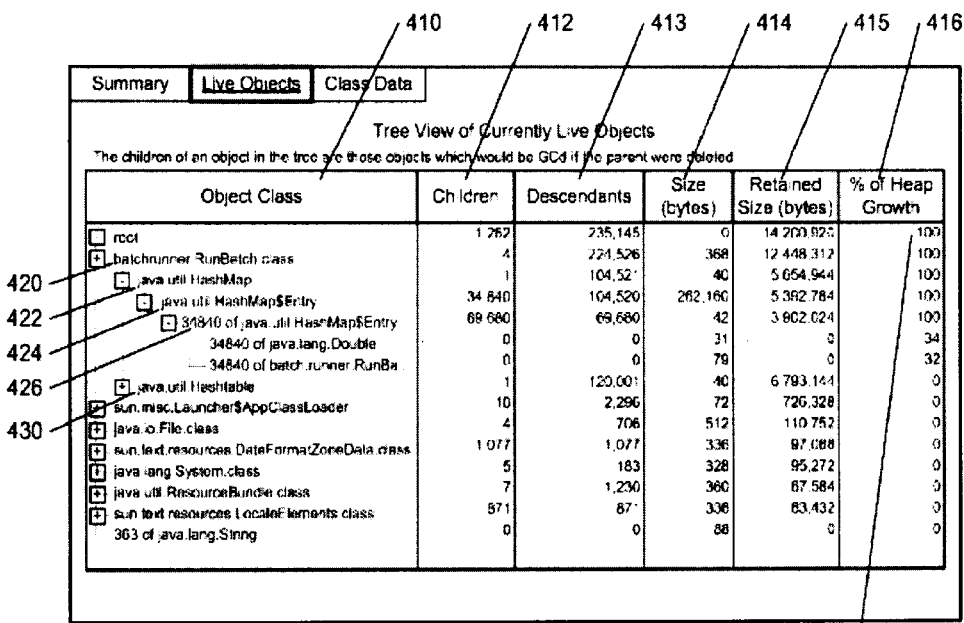
FIGS. 4A-4B illustrate example displays of additional details related to the memory utilization trends in accordance with aspects of this invention.

FIG. 4A illustrates an example presentation of a modified dominator tree in accordance with this aspect of the invention. The first column 410 identifies the object class nodes of the tree, each subsequent indentation of the class nodes indicating a lower hierarchical level of the tree.

For each displayed object class node, the total number of children 412 and descendents 413 of that node is displayed, as well as the size 414 of the object class, the total number of bytes of memory 415 allocated to the object class, and the percentage of growth of memory utilization (heap growth) 416 associated with the object class, a growth of memory utilization being indicative of a memory leak.

Of particular note, in this example, the first class node 420 beneath the root node accounts for 100% of the growth in memory utilization. However, it is likely that a given number of objects of this object class are appropriate for the application, and the source of the instantiation of these objects may not, per se, be the source of the memory leak. As illustrated in this example, the class node 420 comprises two children class nodes 422 and 430. Class node 422 accounts for 100% of the growth in memory utilization, while class node 430 does not cause any growth in memory utilization. That is, the cause of the growth associated with parent class node 420 is solely attributable to the instantiation of objects of class 422, and therefore the cause of this growth should be further investigated. Proceeding in the same manner, we see that the cause of the growth associated with objects of class 422 is solely caused by objects of class 424, and the cause of this growth is solely caused by the instantiation of objects of class 426.

Having isolated the cause of growth in memory utilization to the instantiation of objects of class 426, the user will subsequently review the application code to find the error that is causing this memory leak. However, searching an application program for all of the instances where an object of a particular class is instantiated is generally a tedious and burdensome task.

In accordance with another aspect of this invention, the system identifies where the instantiation of objects of this class occurs within the application code, to facilitate identification of the cause of a memory leak. As noted above, when the instantiations are sampled, an identification of the object and its class are recorded, as well as the call stack at the time of instantiation. The call stack indicates the sequence of calls to subroutines and functions within the application that lead to the instantiation, and thus provides a record of where each sampled instantiation occurs. For ease of reference, the term subroutine is used hereinafter to indicate a section of code that is caused to be executed by a call to that subroutine.

Figure 4B:
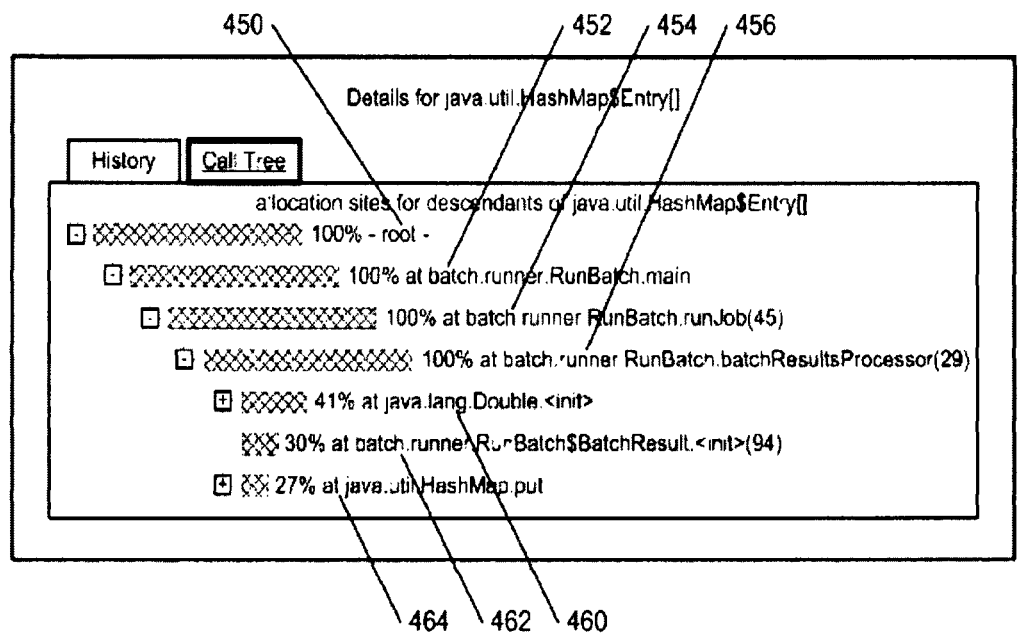

FIG. 4B illustrates a graphic display of a composite of the call stacks that lead to the instantiation of objects at or below the selected node of the denominator tree (in this example, object class 424 of FIG. 4A).

The call tree starts at the root 450 of the application, and therefore, 100% of the instantiations of the as yet unreleased objects at or below the selected node occurs while the root is executing, as indicated. From the root of the application, a subroutine 452 is executed, and every instantiation of these objects occurs while this subroutine 452 is executing. Similarly, all instantiations of the objects at or below the selected node occur while subroutines 454 and 456 are executing. Within subroutine 456, there are multiple locations at which the objects are instantiated; approximately 41% of the instantiations occur within subroutine 460, 30% within subroutine 462, and 28% within subroutine 464. Given this information, the user need only review three subroutines 460, 462, and 464, to isolate the cause of the memory leak in the application.

As can be seen, by sampling the allocations and releases as they occur while the application is executing in an operational environment, the presence of memory leaks can be easily identified, as well as the source/cause of these leaks. By coupling these sampled allocations and releases with the modified form of a dominator tree based on a conventional heap dump, which indicates the amount of memory and/or the growth of memory being consumed by each object class, the user of the system of this invention can focus on the most significant memory-consuming objects to determine the cause of their memory consumption.

Sampling Techniques

In the examples above, the sampling of allocations is a straightforward sampling of "every Nth allocation". However, other sampling techniques may be used, each with particular advantages.

If, for example, a developer has made a modification to an application, the sampling could be restricted to the particular object classes that are instantiated by the modification, thereby reducing the monitoring overhead, and simplifying the analysis task.

In like manner, given that a leak of larger objects will have more impact on utilization than a leak of small objects, the sampling rate could be size dependent, such as sampling medium sized objects at half the rate of larger objects, and small objects at a quarter of the rate.

As an extension to the size dependent sampling, the sampling can be restricted to objects above a given size threshold. Such an approach may be particularly effective when an application is first being monitored and analyzed. After all gross leaks are identified and cured, the threshold can be reduced or eliminated.

The sampling may also be dependent upon the rate at which objects of a given class are instantiated. That is, if an initial sampling indicates that objects of a particular object class are frequently instantiated, the sampling rate for that object class can be increased. Again, such a sampling technique may be particularly effective when the application is first being monitored and analyzed. Alternatively, or additionally, after any gross leaks are identified and cured, the dynamic sampling rate adjustment can be canceled or reversed. That is, after the instantiations of frequently instantiated objects are verified as not causing memory leaks, they need not be sampled as frequently, and the sampling of the less frequently instantiated objects can be increased.

In like manner, the sampling may also be dependent on the age of the objects of a given class. That is, if objects of a given class are found to remain un-released for a long period of time, the sampling rate for these objects may be increased, whereas if objects of another class are found to be relatively short-lived, they need not be sampled as often.

In each of these sampling schemes, the analysis process should be aware of the particular sampling rules, so that the appropriate predictions can be made regarding the actual allocations and releases. Any number of techniques may be employed to assure that the analysis process is consistent with the monitoring process, the most straightforward being the inclusion of the current sampling rules with the reported information (FIG. 1C). In such an approach, the modification of the sampling rules, if any, would occur at each reporting period. Alternatively, the time of each change to the sampling rule can be recorded and subsequently reported, thereby allowing multiple changes within each reporting period.

One of skill in the art will recognize, however, that the analysis process need only be consistent with the sampling of the monitoring process if the reported information must be an accurate estimate of the actual allocation and release rates. If, on the other hand, the purpose of the analysis is to identify memory leaks regardless of their magnitude, an accurate assessment as to how much memory is being lost is not required. In like manner, because the conventional heap snapshots can provide an indication of the magnitude and rate of memory utilization, the association between the sampled objects and the actual allocation can be determined using this snapshot information.

Figure 5:
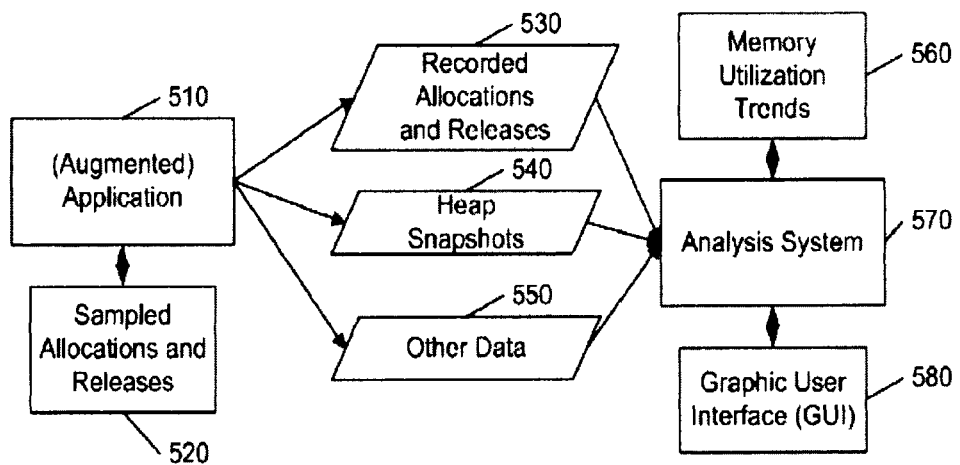
FIG. 5 illustrates an example block diagram of a memory utilization analysis system in accordance with aspects of this invention.

FIG. 5 illustrates an example memory utilization analysis system in accordance with this invention. The analysis system contains a combination of hardware and software, hardware being required to perform tasks and functions as specified by the software. The system is configured to perform some or all of the functions described above.

In accordance with aspects of this invention, an application 510 is augmented to monitor memory allocations and releases, and to record these allocations and releases 520 for subsequent processing by an analysis system 570. Preferably, to minimize the overhead associated with this monitoring, the application 510 is configured to sample fewer than all of the memory allocations.

One of skill in the art will recognize that the system upon which the application 510 is executed may alternatively be augmented to perform this monitoring function for any application that is run on the system. That is, the augmentation of the memory allocation process may be performed by the application that is requesting the allocation (instantiating an object), or by the system that is responding to the request for this allocation. One of skill in the art will also recognize that some or all of the analysis system 570 may be included in the system that is executing the application 510.

The application 510 is also configured to report 530 these monitored allocations and releases 520, as well as other information, such as a conventional snapshot 540 of the allocated memory (heap), and other data 550.

The analysis system 570 includes a processor that is configured to receive the information 530, 540, 550, from the augmented application 510, and to determine therefrom memory utilization trends 560, as detailed above. These utilization trends 560 are provided to a user via a graphic user interface 580, with which the user is provided the opportunity to control the form of the presentation, as well as controlling the level of detail provided for the various analyses, as detailed above. Of particular note, because the recorded memory allocations 530 include a record of the call stack at the time of each instantiation, the cause of problems identified by the memory utilization trends can be identified. Additionally, because the reporting includes a heap dump 540 from which the hierarchical dependencies of objects, and the corresponding size of memory allocation to each object class, can be identified, the graphic user interface 580 can provide an integrated view that facilitates the efficient resolution of memory leaks and other anomalies.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the analysis system is presented herein as a system that is active only when a user seeks an analysis, one of skill in the art will recognize that the analysis system can be configured to continually receive reports from an active application, and provide an alarm feature, wherein if an anomalous memory growth exceeds a given threshold, a user is notified. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may include a processor, and software portions may be stored on a computer-readable medium, and may be configured to cause the processor to perform some or all of the functions of one or more of the disclosed elements;
g) hardware portions may be comprised of one or both of analog and digital portions;
h) any of the disclosed devices or portions thereof may be combined together or separated into further portions unless specifically stated otherwise;
i) no specific sequence of acts is intended to be required unless specifically indicated; and
j) the term "plurality of" an element includes two or more of the claimed element, and does not imply any particular range of number of elements; that is, a plurality of elements can be as few as two elements, and can include an immeasurable number of elements.

What is claimed is:

1. A method of characterizing the performance of an application running on a monitored computer system, wherein the application during operation allocates and releases memory of the computer system for objects created as instances of classes used by the application, wherein said application regularly performs garbage collection to reclaim memory, said method comprising:
   monitoring memory allocations as they occur in the monitored computer system that is running the application;
   sampling a portion of the memory allocations for objects created as instances of the classes used by the application;
   determining patterns of memory utilization by the classes based on the sampled memory allocations and whether the sampled memory allocations have been released; and
   providing information indicating memory utilization patterns by the classes for output on a display.

2. The method of claim 1, wherein monitoring memory allocations comprises receiving an input indicating at least one class selected for monitoring.

3. The method of claim 1, wherein monitoring memory allocations comprises:
   determining a set of predominate classes used by the application; and
   selecting at least one of the predominate classes for monitoring.

4. The method of claim 1, wherein sampling a portion of the memory allocations comprises recording an identification of a location in the application from which the sampled memory allocation was initiated.

5. The method of claim 1, wherein sampling comprises determining the portion of memory allocations based on a frequency of memory allocations used by a class.

6. The method of claim 1, wherein sampling comprises determining the portion of memory allocations based on the size of the memory allocation.

7. The method of claim 1, wherein determining patterns of memory utilization by the classes comprises identifying at least one memory leak by a plurality of objects in a class.

8. The method of claim 1, wherein providing information indicating memory utilization patterns by the classes for output on the display comprises providing information indicating a hierarchy of classes used by the application.

9. The method of claim 1, wherein providing information indicating memory utilization patterns by the classes for output on the display comprises:
   grouping objects of the same class into a single node of a tree displayed on the display.

10. The method of claim 9, wherein grouping the objects of the same class comprises grouping sibling objects of the same class.

11. The method of claim 9, wherein grouping the objects of the same class comprises grouping descendant objects of the same class.

12. The method of claim 1, wherein providing information indicating memory utilization patterns comprises providing information indicating an amount of allocated memory that each class represents.

13. A computer system configured to characterize the performance of an application running on a monitored computer system, wherein the application during operation on the monitored computer system allocates and releases memory of the monitored computer system for objects created as instances of classes used by the application, wherein said application regularly performs garbage collection to reclaim memory, said computer system comprising:
   a processor configured by executable program code for monitoring memory allocations as they occur in the monitored computer system that is running the application, sampling a portion of the memory allocations for objects created as instances of the classes used by the application, and determining patterns of memory utilization by the classes based on the sampled memory allocations and whether the sampled memory allocations have been released; and
   a display, coupled to the processor, providing a graphical user interface indicating memory utilization patterns by the classes.

14. The system of claim 13, wherein the graphical user interface is configured to receive an input indicating at least one class selected for monitoring.

15. The system of claim 13, wherein the processor is configured by executable program code to record an identification of a location in the application from which the sampled memory allocation was initiated.

16. The system of claim 13, wherein the processor is configured by executable program code to determine the portion of memory allocations based on a frequency of memory allocations used by a class.

17. The system of claim 13, wherein the processor is configured by executable program code to identify at least one memory leak by a plurality of objects in a class.

18. The system of claim 13, wherein the graphical user interface displays information indicating a hierarchy of classes used by the application.

19. The system of claim 13, wherein the graphical user interface displays a tree that groups objects of the same class into a single node of the tree.

20. The system of claim 13, wherein the graphical user interface displays a tree that displays objects of the same class as a group of sibling objects.

21. The system of claim 20, wherein the graphical user interface displays descendant objects of the same class as a single group.

22. The system of claim 13, wherein the graphical user interface displays information indicating an amount of allocated memory that each class represents.

23. The system of claim 13, wherein the graphical user interface displays information indicating a location in the application from which the memory allocation was initiated.

* * * * *